United States Patent [19]
Kunze et al.

[11] Patent Number: 5,915,948
[45] Date of Patent: Jun. 29, 1999

[54] INSECT ATTRACTANT DEVICE

[75] Inventors: Walter A. Kunze, Southington; Carl D. Contadini, Teryville, both of Conn.

[73] Assignee: Waterbury Companies, Inc., Waterbury, Conn.

[21] Appl. No.: 08/864,469

[22] Filed: May 28, 1997

[51] Int. Cl.⁶ .............................. A01M 1/14; A01M 1/04
[52] U.S. Cl. ................................................. 43/114; 43/113
[58] Field of Search .............................. 43/107, 113, 114

[56] References Cited

U.S. PATENT DOCUMENTS

| | | |
|---|---|---|
| 4,117,624 | 10/1978 | Phillips . |
| 4,229,779 | 10/1980 | Bilson et al. . |
| 4,262,379 | 4/1981 | Jankiewicz ................................... 9/8 R |
| 4,332,100 | 6/1982 | Schneider . |
| 4,490,937 | 1/1985 | Yavnieli . |
| 4,506,993 | 3/1985 | Brown ....................................... 368/314 |
| 4,696,126 | 9/1987 | Grothaus et al. . |
| 4,700,506 | 10/1987 | Williams . |
| 4,829,702 | 5/1989 | Silvandersson . |
| 4,876,822 | 10/1989 | White . |
| 4,918,856 | 4/1990 | Olive et al. . |
| 4,949,501 | 8/1990 | Larkin . |
| 4,959,923 | 10/1990 | Aiello et al. . |
| 4,979,329 | 12/1990 | Olive et al. . |
| 5,044,112 | 9/1991 | Williams . |
| 5,105,397 | 4/1992 | Whitney ...................................... 368/80 |
| 5,142,815 | 9/1992 | Birdsong . |
| 5,259,153 | 11/1993 | Olive et al. . |
| 5,301,456 | 4/1994 | Jobin et al. ................................ 43/113 |
| 5,331,760 | 7/1994 | DuMont . |
| 5,365,690 | 11/1994 | Nelson et al. . |
| 5,425,197 | 6/1995 | Smith ......................................... 43/113 |

OTHER PUBLICATIONS

"Introducing Aurora 360", Waterbury Companies, www.watco.com/janitor/aurora2.htm, Internet pp. 1–3, Jun. 22, 1998.

"Reflector Lamps", National Lighting Product Information Program, www.rpi.edu/dept/lrc/abstracts/SRA–ReflLamp.html, Internet, pp. 1–6, Jun. 22, 1998.

Relative Attractiveness of Paired BL and BLB Fluorescent Bulbs for House and Stable Flies (Diptera Muscidae), Lawrence G. Pickens, Livestock Insects Laboratory, Livestock and Poultry Science Institute, vol. 82, No. 2, pp. 535–538, Oct. 1988.

Fang Reflektor—iGu AG CH 6432 Rickenbach Schweiz/Switzerland.

Non–Toxic Commercial Flytrap Attracts and Traps Flying Insects.

Gilbert Insect Light Traps—Gilbert Industries, Inc. 5611 Kruger Drive, Jonesboro, AR 72401.

Vector Fly Prevention Guide.

The Natural Choice For Flying Insect Control—PestWest Electronics Limited, Denholme Drive, Ossett, West Yorkshire, WF5 9NB, U.K.

*Primary Examiner*—Michael J. Carone
*Assistant Examiner*—Fredrick T. French, III
*Attorney, Agent, or Firm*—St. Onge Steward Johnston & Reens LLC

[57] ABSTRACT

An insect trap is disclosed which comprises a base mounted to a wall or other suitable surface. An insect attractant light source is operatively connected inside the base. A reflector is suitably positioned adjacent the wall such that the light from the light source is at least partially transmitted onto the reflector and then reflected away from the wall. The trap also includes an insect immobilizer, such as a semi-rigid adhesive board on which to trap the insects. Additionally, the trap may include an insect attractant, such as scents, pheromones or visual clues.

18 Claims, 4 Drawing Sheets

INSECT ATTRACTANT DEVICE

FIELD OF THE INVENTION

The present invention relates to illuminated traps adapted to attract insects, particularly flying insects, and eliminate them from the environment of the trap (i.e., the room in which the trap is located). More specifically, the inventive trap utilizes a source of ultra-violet light to attract the insects and includes an immobilizer, such as an adhesive board, or other like device, which prevents the insects from escaping the trap and, thus, eliminates them from the environment in which the trap is located.

The problem of ridding an indoor area of insects has existed for many years. Besides the annoyance of insects, especially flying insects, in an area, insects can breed filth and carry and spread disease. The presence of insects in commercial locations, especially food handling areas, can be unsanitary, undesirable and dangerous. Indeed, the presence of insects can lead to violations of local health codes in restaurants, cafeterias and the like.

Because many insects are diurnal in nature, they are active in the daytime. Such insects have been found to react well to certain wavelengths of light, especially light in the ultraviolet (UV) wavelengths, such as about 2000 Angstroms to about 4500 Angstroms. Devices that utilize light in this range of wavelengths have been developed and used in a variety of ways to attract and, ultimately, kill insects.

Many available devices for ridding an area of insects have severe disadvantages, particularly in food handling areas. They can be unsightly, utilize poisons and other chemicals (such as attractants) which have undesirable smells and hence are inappropriate for use in food handling locations. In the case of devices which electrocute insects (so-called "bug-zappers"), the electrocution of the insects can explode insect body parts into the air, causing contamination around food. Some insect attractant and elimination devices actually tend to draw insects into the room where they are located, such as those devices having exposed sources of insect attractant light.

BACKGROUND OF THE INVENTION

Insect traps making use of light sources are known. For example, U.S. Pat. No. 4,696,126 to Grothaus et al. teaches the use of an upright array of parallel exposed conductors dimensioned and spaced such that alighting houseflies, for example, virtually have to alight in contact with two such conductors. Opposing pulsating charges cause the houseflies to fly down onto a nontoxic adhesive trapping board. The captured insect can then be disposed of by removing the adhesive sheet. The device taught by Grothaus is disadvantageous because it does not provide means to draw the insects to the light source nor does it disclose use of an ultraviolet source, which has been found to be extremely effective at attracting insects.

U.S. Pat. No. 4,700,506 to Williams discloses a flea trap comprising a shallow base pan, a sticky substance within the shallow base pan, a light reflecting cover positioned and supported over the pan and an electrically energized green light source. Fleas are supposedly attracted to the reflected and directly radiated light source, jump over the side wall of the shallow pan and onto the sticky substance which prevents their escape and causes their eventual extermination. The reflecting surface of cover (13) is positioned such that downwardly reflected green light as well as downwardly-directed radiated green light is transmitted towards pan (11). The device taught by Williams is disadvantageous in that it does not reflect the maximum amount of light into the surrounding environment, but rather back towards the shallow base pan.

White, in U.S. Pat. No. 4,876,822, discloses an insect trap which comprises an insect attractant light source and a light-reflective surface on the bottom of the trap. The light emitted from the light source is transmitted directly through a passageway through the bottom of the enclosure; additionally, light is reflected toward the upper end of the compartment. Because the reflective material is attached to the inner surface of the bottom wall of the closure, it is concealed from view. The device taught by White is disadvantageous because it does not reflect the insect attractant light away from the mounting surface.

U.S. Pat. No. 4,949,501 to Larkin discloses a flying insect trap which comprises a U-shaped fluorescent light. The device taught by the '501 patent is mounted onto a hinged member, which moves the trap between a light-exposing position and a light-hiding position. If a restaurant, for example, is filled with patrons, the trap may be moved to the light-hiding position to enhance the appearance of the restaurant. The '501 patent to Larkin fails to disclose the use of a reflector.

U.S. Pat. No. 5,365,690 to Nelson et al. discloses an insect trap mounted on a vertical surface comprising an ultraviolet light used in combination with a reflector. The base and the light source cooperate to form an upwardly facing opening where the insects enter the trap, and for the reflection of the light onto the vertical surface. The device taught by Nelson et al. is disadvantageous in that the insect attractant light is reflected onto the vertical mounting surface, or wall as opposed into the surrounding environment to attract the maximum number of insects into the base.

In U.S. Pat. No. 4,117,624, Phillips discloses an insect trap comprising an insect attractant ultraviolet light and a disposable sticky reflecting surface on which to trap them. A reflector for the trap is a trough-line structure into which the adhesive material slips after appropriate creasing. The holder then attaches to an ultraviolet lamp fixture so that the trap element, on the inside of the holder, acts as a reflector for the lamp, with the sticky surface surrounding the lamp on three sides. The reflector action of the trap element assertedly concentrates the ultra-violet radiation emitting from the open side of the channel to give the effect of a much brighter source of light, which is more attractive to insects. The device taught by the '624 patent is disadvantageous because it reflects light onto a surface which can severely reduce the ability to detect the light, thereby reducing its effectiveness.

U.S. Pat. No. 4,229,779 to Bilson et al. discloses a luminaire with an arcuate reflector. The reflector is configured to prevent reflected light from passing through the light source although beams of at least one section are directed along paths closely adjacent to the light source. The '779 patent fails to teach the use of the reflector in combination with an insect trap and/or insect-attractant light source.

What is desired, therefore, is an insect trap, which is effective as compared with conventional traps, which utilizes reflected light in a manner so as to increase per unit of time the number of insects attracted to the device, which operates quietly and effectively, without the use of poisons, electrocution or other disadvantageous elements, and which is unobtrusive and easy to maintain.

SUMMARY OF THE INVENTION

Accordingly, it is an object of the present invention to provide an insect trap that is more effective than conventional insect traps.

It is another object of the present invention to provide an insect trap that attracts more insects per unit of time than conventional insect traps.

It is another object of the present invention to provide an insect trap which is safe to use in food handling areas, since it does not utilize poisons, electrocution or other elements which are unsanitary or which may otherwise cause food contamination.

It a further object of the present invention to provide an insect trap that operates quietly and effectively, and which is unobtrusive.

It is yet a further object of the present invention to provide an insect trap that is easier to maintain than conventional insect traps.

To overcome the deficiencies of the prior art and to achieve the objects and advantages listed above, an improved insect trap is disclosed. The insect trap comprises a base and at least one connector for connecting the base to a mounting surface, such as a wall. At least one insect attractant light source is operatively connected to the base. A reflector having a reflecting surface is attached to the mounting surface such that the reflecting surface faces away from the mounting surface. The reflecting surface is positioned so as to receive light from the insect attractant light source and to reflect the illuminated light away from the mounting surface and into the surrounding environment. By positioning the reflecting surface so as to maximize the amount of reflected light transmitted to the surrounding environment, the insect trap of the present invention appears consistently very bright, independent of the color or nature of the mounting surface, and thus attracts a maximum number of insects.

The inventive insect trap also comprises an opaque hood operatively connected to the base so as to at least partially block the collected insects from the view of a casual observer and also block the light source from direct viewing. Additionally, an insect immobilizer, such as a board or other like element having an adhesive surface, is positioned substantially within the hood, to trap and contain the insects attracted by the device. Alternatively, other insect trapping and/or exterminating materials or devices, such as poisons or electrocuting devices, can be substituted for, or used in combination with, the insect immobilizer, although doing so may be undesirable if the inventive trap is to be used in food handling areas or other areas sensitive to contamination with the poisons or flying insect parts.

Advantageously, the insect trap of the present invention may comprise an insect attractant, preferable in concert with the immobilizer. Suitable insect attractants include, but are not limited to, insect food or a pheromone or a mixture of pheromones that can be located so as to draw insects to the immobilizer. Other insect attractants, such as scents or visual attractants may also be used. Of course, attractants can be combined to draw the insects to the immobilizer, once the insects are drawn into the trap by the reflected light.

The insect trap also preferably further comprises a functional or decorative element so as to disguise nature of the trap from observers. For instance, the portion of the hood facing into the environment where the trap is located can include thereon a clock, making the inventive trap appear to be simply a clock, as opposed to an insect attractant device. This can be especially advantageous if the insect trap of this invention is to be located in public areas, such as the dining room of a restaurant or cafeteria. Other elements which can be used to disguise the nature of the insect trap can include signs having, for example, a store's name or "exit," if appropriate. Likewise, a decorative pattern can be included on the outward-facing portion of the hood.

The invention and its particular features and advantages will become more apparent from the following detailed description when considered with reference to the accompanying drawings.

DETAILED DESCRIPTION OF THE DRAWINGS

Referring to the drawings in detail, an insect trap is shown and generally designated by the reference numeral 10. It should be noted that for the sake of clarity all the components and parts of insect trap 10 may not be shown and/or marked in all the drawings. As used in this description, the terms "up", "down", "top", "bottom", etc. refer to insect trap 10 when in the orientation illustrated in FIG. 1, although it will be understood that insect trap 10 can be utilized in a variety of orientations.

Figures 3, 3A:
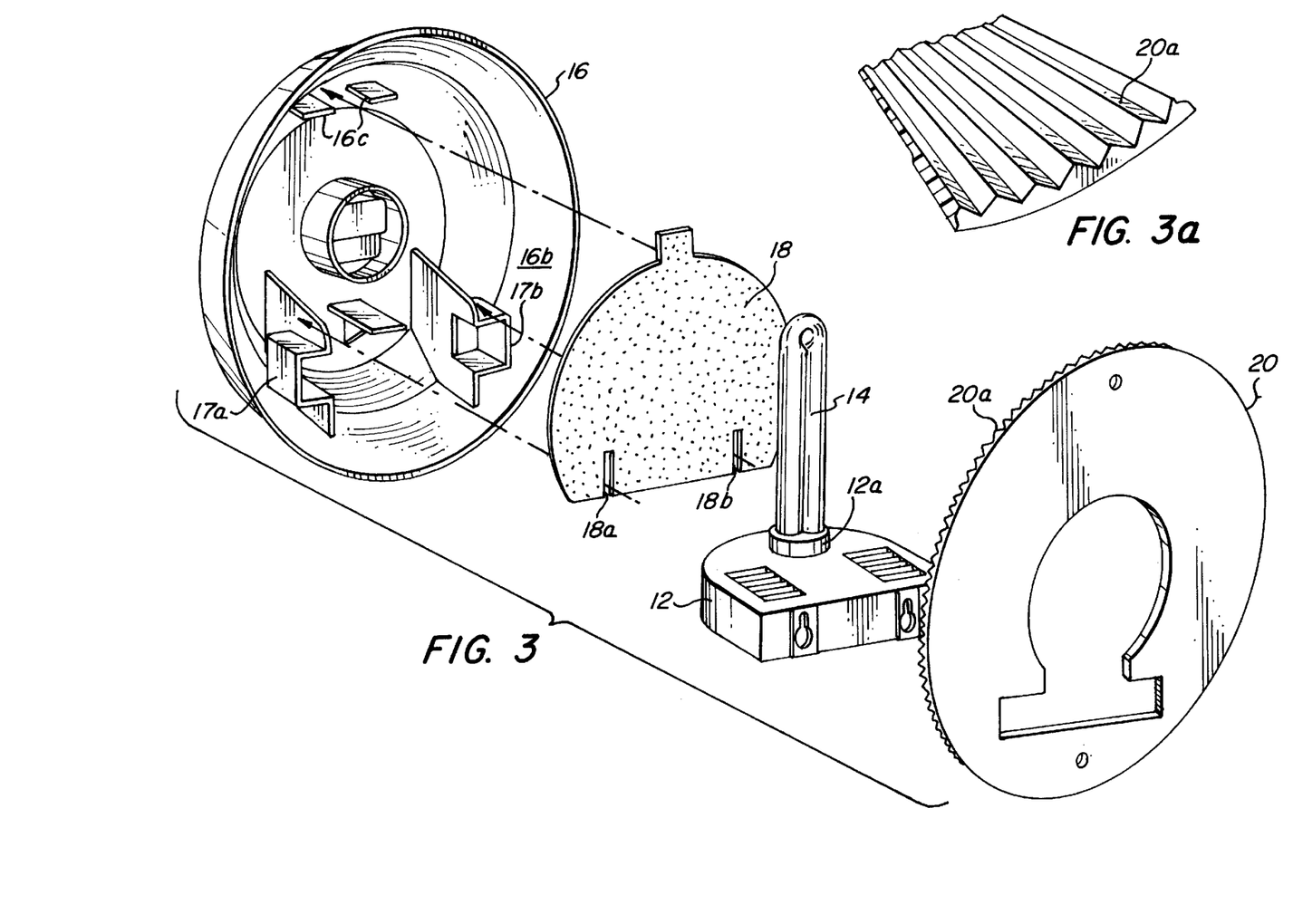
FIG. 3 is an exploded rear perspective view of the insect trap shown in FIG. 1.
Figure 4:
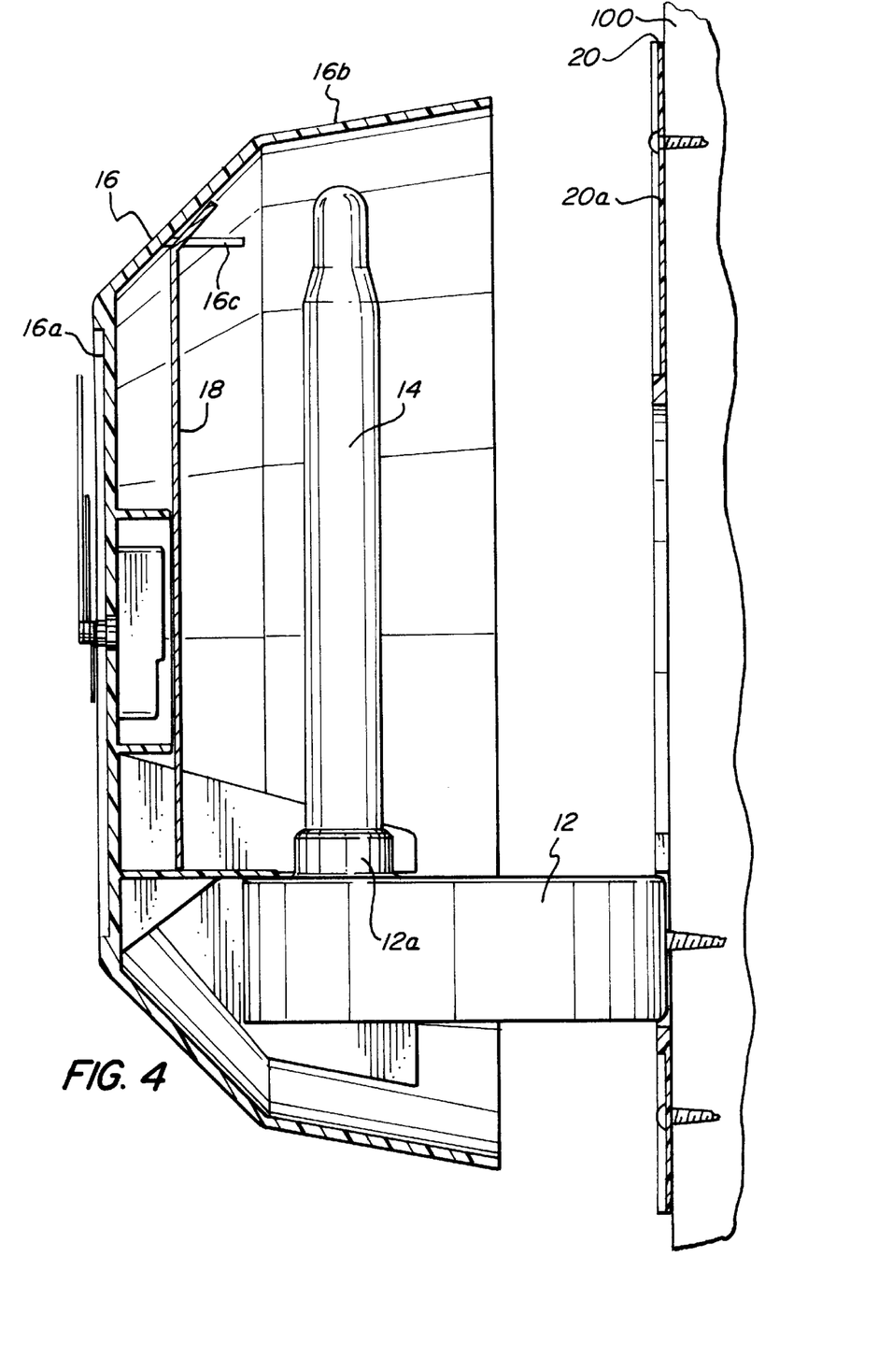
FIG. 4 is a side cross-sectional view of the insect trap shown in FIG. 2 taken along lines 4—4.

Referring to FIGS. 3, 4, insect trap 10 comprises a base 12 to which a source of light is operatively connected. Base 12 can be formed of any suitable material, such as dimensionally stable plastics, metals, etc. Preferably, base 12 is formed of a dimensionally stable plastic so as to reduce the weight of trap 10. Base 12 comprises any suitable substrate for the connection of a source of light, and, as such, can include components such as a transformer, a starter, etc. (all not shown), as well as a socket or like element 12a for connection thereinto of a light bulb or bulbs. In addition, base 12 is mounted, either directly or indirectly to a mounting surface 100 through the agency of, for instance, screws, anchors, etc. A suitable mounting surface 100 for base 12 (and therefore insect trap 10) can be any surface to which the insect trap 10 is desired to be mounted, such as a wall, door, ceiling, etc.

Preferably, base 12 is mounted at or near a source of electrical connection, such as an electrical socket, in order to provide the electricity for the source of light to be employed through electric cord 126. Alternatively, base 12 can be hard-wired into an electrical connection. It should be understood that the electrical connections may be of any suitable type. For example, trap 10 can be installed over or adjacent a wall receptacle (not shown) which in turn could be energized from a remote switch (not shown) or, alternatively, a switch (not shown) could be installed directly on the unit 10. Suitable remote switches and unit switches are known in the art.

Figure 2:
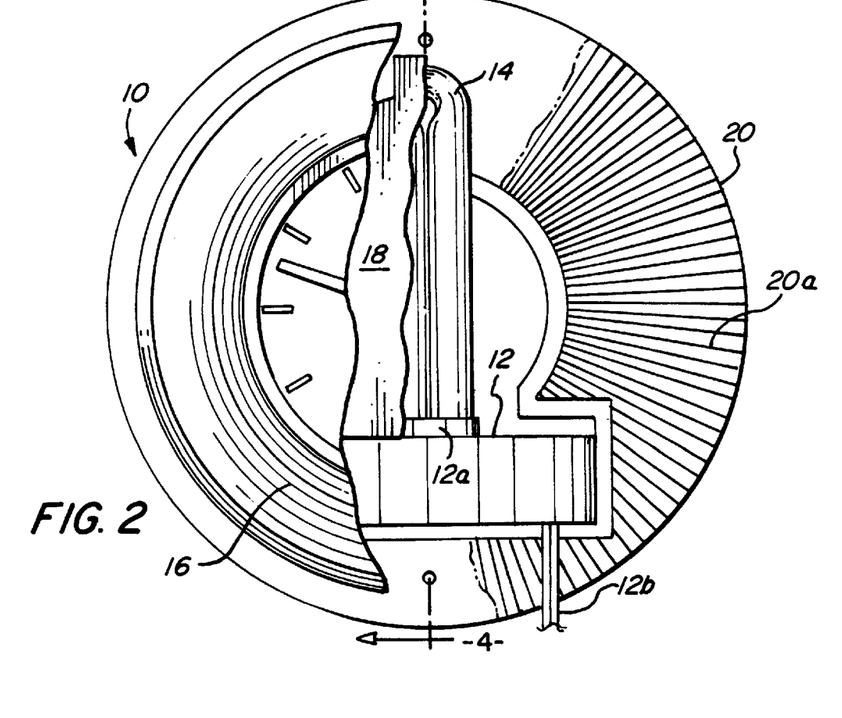
FIG. 2 is a partially broken away front plan view of the insect trap shown in FIG. 1.

As best shown in FIGS. 2–4, trap 10 further comprises at least one insect attractant light source 14 operatively connected to base 12. More specifically, insect attractant light source 14 preferably comprises a source of ultraviolet light such as at least one ultraviolet light bulb. Alternatively, light source 14 can comprise a fluorescent light source or bulb having a filter thereover which permits the transmission of ultraviolet light only. Insect attractant light source 14 is capable of emitting light of a wavelength in the ultraviolet wavelength range, and especially light having a wavelength which is between about 2000 Angstroms and about 4500 Angstroms. More preferably, the wavelength of light emitted by insect attractant light source 14 is between about 3000 Angstroms and about 4300 Angstroms. It should be understood that as many light bulbs 18 as desired may be used.

Insect trap 10 also comprises an opaque hood 16. See FIG. 3. Hood 16 comprises an article having a front 16a (or forward-facing portion) which faces into the environment in which insect trap 10 is located and side(s) 16b, and is positioned so as to at least partially block light source 14 and collected insects from the environment in which trap 10 is located and therefore from view of the casual observer and to make trap 10 aesthetically appealing.

Hood 16 can assume any particular shape such as round or rectangular and can be formed of any material having the desired structural integrity and dimensional stability, as well as opacity, required of hood 16. Most preferably, and especially because of weight and other like considerations, hood 16 is made of a dimensionally stable plastic material, such as impact styrene, acrylonitrile-butadiene-styrene copolymer (ABS) or the like.

The function of hood 16 to block light source 14 from view is important for reasons other than aesthetic. By blocking the direct viewing of light source 14, hood 16 helps avoid attracting insects into the room or other environment where insect trap 10 is located. In other words, the action of light source 14 draws insects into insect trap 10, where they are immobilized and eliminated from the environment; however, if, as in prior art devices, insects are drawn from other areas into the environment because the light source is exposed, then the insect trap can be, in effect, counterproductive, drawing insects in the environment rather than eliminating them. The placement of hood 16 so as to at least partially block light source 14 prevents this from happening.

In order to provide its light source 14 and collected insect blocking function, hood 16 is operatively connected to base 12. Most preferably, hood 16 is mounted to base 12, and thereby to mounting surface 100. Hood 16 can be mounted to base 12 by any of a variety of elements. For instance, hood 16 can be mounted to base 12 via screws, hinges, etc. Most advantageously, hood 16 is removably mounted to base 12 such as through the action of tabs 17a, 17b on hood 16 which can engage the edges of base 12 to thereby mount hood 16 to base 12. Thus, hood 16 can be removed to allow an operator quick and easy access into the trap to remove trapped insects or to replace the insect attractant light source 14, an insect immobilizer 18, clean the apparatus, etc.

The mounting of hood 16 to base 12 functions to, inter alia, block direct viewing of light source 14 as discussed above. To do so, hood 16 must be mounted to base 12 such that the side(s) 16b of hood 16 are sufficiently close to mounting surface 100 such that essentially only light reflected from a reflector 20 (as discussed hereinbelow) can be seen. To that end, the side(s) 16b of hood 16 can be as close to mounting surface 100 as one inch or even closer, or as far as several inches, depending on the dimensions of insect trap 10 and the amount of light reflected. Because of the partially "closed" nature of hood 16 and the presence of insect attractant light source 14 in hood 16, the air within hood 16 can be warmed. This warmth can act as a further insect attractant, drawing into trap 10 insects drawn to reflector 20.

An insect immobilizer 18 is positioned substantially within hood 16 in order to trap and immobilize for disposal insects drawn into trap 10 as shown in FIGS. 3, 4. In the preferred embodiment, insect immobilizer 18 comprises a semi-rigid board or other like element having an adhesive surface. For the purposes of this application, the term insect immobilizer includes any device or surface that prevents flies or other insects or pests from escaping from the trap after entry. Immobilizer 18 can be positioned such that it sits against or abuts the inside of hood 16. Advantageously, hood 16 includes immobilizer tabs 16c to maintain immobilizer 18 in position. Immobilizer 18 can also include other structures, such as slits 18a and 18b which can also be used to maintain immobilizer 18 in position with respect to hood 16 by engaging tabs 17a, 17b.

Once insects are drawn into trap 10, they are prevented from exiting trap 10 by becoming held by immobilizer 18. To that end, the insects must be drawn into trap 10 and to immobilizer 18. As mentioned above, the warmth generated by the placement of insect attractant light source 14 within hood 16 can draw insects into trap 10. Other insect attractants can also be employed in conjunction with immobilizer 18 in order to draw insects to immobilizer 18 where they are trapped.

For instance, a pheromone or combination of pheromones can be used to draw insects to immobilizer 18. Advantageously, the pheromone(s) can be applied directly to immobilizer 18, such as in a patch. Another insect attractant which can be employed is a scent, such as the scent of a food like peanut butter, which will draw insects to immobilizer 18. The immobilizer 18 can have the source of such a scent coated thereon. Visual clues can also be used. Immobilizer 18 can have printed on it the image of insects already present thereon. This will draw insects to immobilizer 18. Of course, these attractants can be combined, such that immobilizer 18 includes pheromones, has an attractive scent associated therewith, and includes the images of insects thereon.

Although not preferred, immobilizer 18 can also include or have associated therewith other devices or elements for attracting and/or immobilizing insects. Such other devices or elements can include pesticides in the form of a surface layer or trap, active and passive mechanical traps, liquid traps into which the insects become immersed, high or low D.C. or pulsed voltage electric grids, or other such means that can trap, immobilize or kill insects. Insect trap 10 may also include an effective amount of any suitable known insecticide. A variety of volatile and non-volatile insecticides and formulated insecticide compositions are known to be effective against flying insects. Most preferably, the insecticides for use with this invention are nonvolatile formulated insecticide compositions that kill pests upon contact. Such nonvolatile pesticide compositions are not released into the environment surrounding the trap 10. Such materials include, but are not limited to, pyrethroid and organophosphate insecticide compositions. Of course, as noted above, such additional devices or elements are not desirable in the situation where insect trap 10 is to be used in a food handling or other contamination-sensitive area.

Once a sufficient number of insects have been trapped on immobilizer 18, or the attractants, such as pheromones, employed with immobilizer 18 have been exhausted, immobilizer 18 can be replaced with a fresh immobilizer. Preferably, immobilizer should not have to be replaced more often than every two weeks, and most preferably every 30 days, for convenience, depending, of course, on the level of target insects in the environment where trap 10 is located. To that end, therefore, the level of attractant associated with immobilizer 18 should be sufficient to remain effective for at least that period of time.

Figure 1:
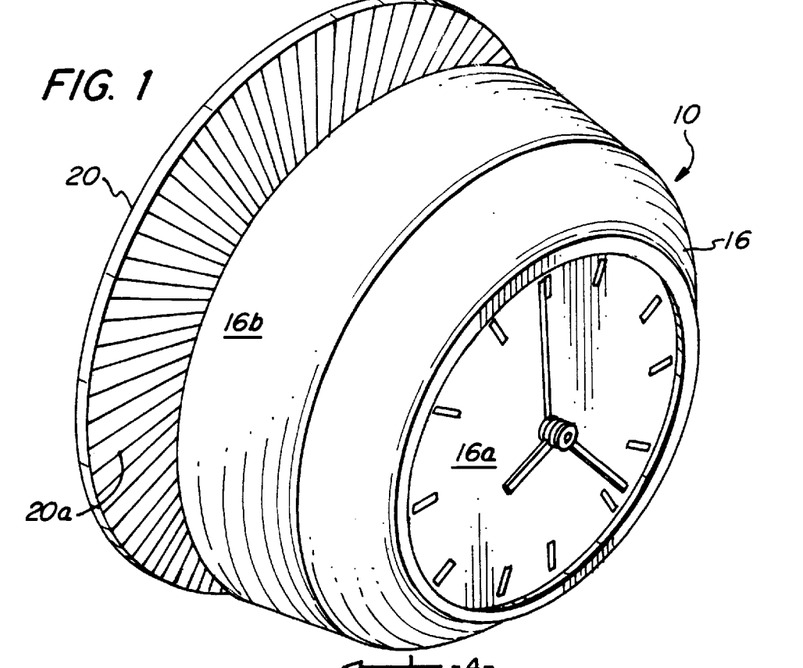
FIG. 1 is a front perspective view of an insect trap constructed in accordance with the present invention.

Insect trap 10 also comprises at least one reflector 20 having a reflecting surface 20a, illustrated in FIGS. 1, 2. Reflector 20 is mounted to mounting surface 100 such that reflecting surface 20a faces away from mounting surface 100 so as to receive illuminated light from insect attractant light source 14 and to reflect the illuminated light away from mounting surface 100, preferably radially. It should be understood that trap 10 may be mounted in any suitable manner or orientation so long as reflector 20 is positioned relative to light source 14 so as to receive illuminated light from insect attractant light source 14 and to reflect the illuminated light away from the mounting surface 100. To that end, reflector 20 is positioned such that, when insect trap 10 is viewed from its front, i.e., when it is viewed directly towards the front 16a of hood 16, at least a portion of reflector 20 can be seen; most advantageously, a portion of reflector 20 will be viewed about the entire perimeter of hood 16.

Reflector can be formed of any material capable of reflecting light. Most preferably, reflector 20 is at least partially formed of a plastic material, (like high impact styrene or ABS) such as one colored or painted white to maximize the reflectance achieved. The surface of reflector 20 can be polished or metallized to enhance reflectance, although a "mirror surface" may be undesirable since it may permit viewing of light source 14 within hood 16. Although reflector 20 can comprise a relatively flat piece of material, it may be preferred to form a pattern in reflector 20, such as the ribbed pattern which can be seen in FIG. 3a, in order to increase the dispersion of the light reflected from reflector 20.

Significantly, because of the nature of reflector 20, the nature of mounting surface 100 does not have a significant effect on the efficacy of insect trap 10. For instance, in those prior art devices that utilize reflected light to attract insects by directing light onto a wall, the effectiveness of the device is severely compromised if the surface on which the light is directed does not adequately show the light. In the case of a wood paneled wall, the light directed on to the wall is not very visible to insects and, thus, the device is not very effective at its insect attractant function. In insect trap 10 of the present invention, however, because light is directed to reflector 20, and not to a wall, and the light is reflected from reflector 20 away from mounting surface 100, the nature of mounting surface 100 will not have a deleterious effect on the attracting of insects. Therefore, insect trap 10 can be effectively used with virtually every type of mounting surface 100.

Figure 5:
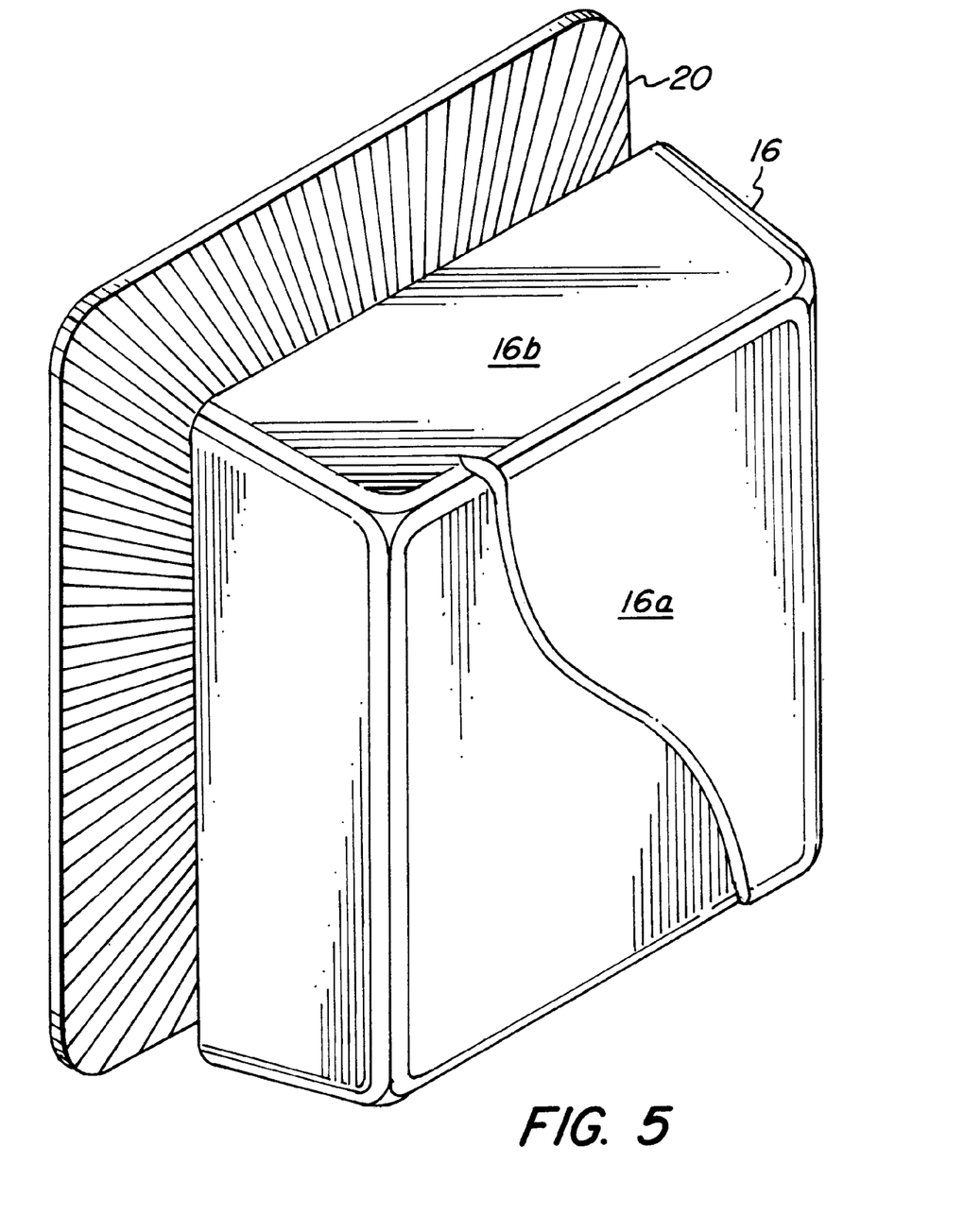
FIG. 5 is a front perspective view of an insect trap constructed in accordance with the present invention, showing a different shape for hood 16.

Advantageously, as noted above, the nature of insect trap 10 can be disguised by incorporating into the front 16a of hood 16 a decorative or functional element. Advantageously, as illustrated in FIG. 1, front 16a of hood 16 comprises a clock 116, which makes insect trap 10 appear to be merely a clock, without the observer necessarily knowing it is in fact an insect trapping device. This can be highly desirable when insect trap 10 is located in the public areas of a restaurant or cafeteria, such as the dining room. Other elements which can be included in the front 16a of hood 16 include a decorative or informational applique, a sign such as "exit" or the like (not shown). In the alternative, the front 16a of hood 16 can comprise a decorative element to provide a more aesthetically pleasing outward appearance, as illustrated in FIG. 5.

In use, insect trap 10 is mounted on a mounting surface 100, which can comprise a wall, ceiling, door or the like. The light emitted by insect attractant light source 14 is directed at reflector 20; light other than that aimed (either directly or indirectly) at reflector 20 is blocked from exiting insect trap 10 by hood 16. From reflector 20, the light is directed in to the room or other location where insect trap 10 is located; in the dark, it appears as if a "halo" of light surrounds hood 16 when insect trap 10 is used in its most preferred embodiment. Insects observing the reflected light are drawn to insect trap 10, which they enter, preferably further drawn in by the secondary attractants (heat, pheromones, scents and visual clues) discussed hereinabove, where they become trapped by immobilizer 18 and can be safely disposed of. It should be noted that trap 10 has been described for use with flying insects (such as flies, gnats, minges, fruit flies, black flies, etc.) for the sake of convenience only. Other non-flying pests may be trapped in the same manner, including spiders and ticks, for example.

It should be further understood that insect trap 10 of the present invention has numerous advantages. It has the ability to attract various kinds of pests, both flying and non-flying. The trap itself may be easily maintained, simply by removal of hood 16 for replacement of light source 14 or immobilizer 18, etc. The trapped insects are hidden from view at all times. The unit operates silently and effectively, giving off no detectable odor. It is safe to use even in food handling areas since, in the preferred embodiment, all of the elements are non-toxic to pets or humans. It runs economically on house current and is easy to maintain, the only replacement parts being the ultraviolet light bulb(s) used as light source 14, a starter and immobilizer 18.

Another advantage of insect trap 10 arises from the particular nature of hood 16. Because of the "partially-closed" nature of hood 16, when hood 16 is removed from trap 10 and oriented such that the front 16a of hood 16 becomes the bottom, hood 16 becomes a container permitting transport of the immobilized insects for disposal. This is in contrast to conventional insect traps where the act of disposal often leads to dropping insects along the way.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. An insect trap for mounting to a mounting surface, comprising:

a base capable of being mounted to a mounting surface, the base comprising a source of insect attractant light;

a hood having a front opposite the mounting surface operatively connected to the base such that light from the source of insect attractant light other than that directed towards the mounting surface is substantially blocked by the hood; and at least one reflector having a reflecting surface, the reflector mounted to the mounting surface such that the reflecting surface faces away from the mounting surface and at least a portion of said reflector can be seen when viewed from the front of said hood and an insect immobilizer.

2. The insect trap of claim 1, wherein the insect attractant light source comprises a source of light in ultraviolet light wavelengths.

3. The insect trap of claim 2, wherein the wavelength of light produced by the source of insect attractant light has a wavelength between about 2000 Angstroms and about 4500 Angstroms.

4. The insect trap of claim 1, further comprising said insect immobilizer positioned substantially within the hood.

5. The insect trap of claim 4, wherein the insect immobilizer comprises a semi-rigid board having an adhesive surface capable of trapping insects thereon.

6. The insect trap of claim 1, further comprising an insect attractant capable of drawing insects to the insect immobilizer.

7. The insect trap of claim 6, wherein the attractant comprises a pheromone, an insect attractant scent, an insect food, an insect attractant visual clue, or combinations thereof.

8. The insect trap of claim 1, further comprising an element to facilitate disguising the function of the trap from observers.

9. The insect trap of claim 8, wherein the element comprises an operable clock mounted in the hood.

10. A device for trapping flying insects, comprising:
a base mounted to a mounting surface, the base comprising a source of insect attractant light capable of transmitting light in the ultraviolet wavelength;
a hood having a front and sides, the hood operatively connected to said base such that, when the hood is viewed from its front, said base cannot be seen; and
at least one reflector having a reflecting surface, the reflector mounted to the mounting surface such that the reflecting surface faces away from the mounting surface, the reflecting surface positioned so that at least a portion of said reflector can be seen when viewed from the front of said hood and an insect immobilizer.

11. The device of claim 10, wherein the wavelength of light produced by the source of insect attractant light has a wavelength between about 2000 Angstroms and about 4500 Angstroms.

12. The device of claim 10, wherein the hood prevents light produced by the insect attractant light source from being seen when the hood is viewed from its front, except for that light reflected by the reflector.

13. The device of claim 12, further comprising said insect immobilizer positioned substantially within the hood.

14. The device of claim 13, wherein the insect immobilizer comprises a semi-rigid board having an adhesive surface capable of trapping insects thereon.

15. The device of claim 10, further comprising an insect attractant capable of drawing insects to the insect immobilizer.

16. The device of claim 15, wherein the attractant comprises a pheromone, an insect attractant scent, an insect food, an insect attractant visual clue, or combinations thereof.

17. The device of claim 10, further comprising an element to facilitate disguising the function of the trap from observers.

18. The device of claim 17, wherein the element comprises an operable clock mounted in the hood.

* * * * *

UNITED STATES PATENT AND TRADEMARK OFFICE
CERTIFICATE OF CORRECTION

PATENT NO. : 5,915,948
DATED : June 29, 1999
INVENTOR : Walter A. Kunze, et al

It is certified that error appears in the above-identified patent and that said Letters Patent is hereby corrected as shown below:

Column 8, lines 55 - 60; this paragraph should be formatted as follows:

"at least one reflector having a reflecting surface, the reflector mounted to the mounting surface such that the reflecting surface faces away from the mounting surface and at least a portion of said reflector can be seen when viewed from the front of said hood and
an insect immobilizer."

Column 9, line 26 – column 10, line 2; this paragraph should be formatted as follows:

"at least one reflector having a reflecting surface, the reflector mounted to the mounting surface such that the reflecting surface faces away from the mounting surface, the reflecting surface positioned so that at least a portion of said reflector can be seen when viewed from the front of said hood and
an insect immobilizer."

Signed and Sealed this

Fourteenth Day of December, 1999

Q. TODD DICKINSON

*Attest:*

*Attesting Officer*   *Acting Commissioner of Patents and Trademarks*